Aug. 12, 1969 JAMES E. WEBB 3,461,437
ADMINISTRATOR OF THE NATIONAL AERONAUTICS
AND SPACE ADMINISTRATION
DIGITAL MEMORY IN WHICH THE DRIVING OF EACH WORD
LOCATION IS CONTROLLED BY A SWITCH CORE
Filed Sept. 16, 1965 2 Sheets-Sheet 1

INVENTOR
LAWRENCE J. ZOTTARELLI
BY
ATTORNEYS

ADMINISTRATOR OF THE NATIONAL AERONAUTICS AND SPACE ADMINISTRATION

DIGITAL MEMORY IN WHICH THE DRIVING OF EACH WORD LOCATION IS CONTROLLED BY A SWITCH CORE

Filed Sept. 16, 1965 2 Sheets-Sheet 2

(e)

| | STATE $t_1$ | A | B | STATE $t_2$ | |
|---|---|---|---|---|---|
| SET | 0 | + | X | 0 | (1) |
| | 1 | + | X | 1 | (2) |
| PRIME | 0 | X | + | 0 | (3) |
| | 1 | X | + | P1 | (4) |
| READ | P1 | + | X | 1 | (5) |
| | 0 | + | X | 0 | (6) |
| WRITE "1" | 0 | − | X | P1 | (7) |
| | 1 | − | X | P1 | (8) |
| WRITE INFO | 1 OR P1 | + | + | 0 | (9) |
| | 1 OR P1 | + | X | 1 | (10) |

INVENTOR
LAWRENCE J. ZOTTARELLI
BY
G. T. McCoy
J. H. Warden
ATTORNEYS

United States Patent Office 3,461,437

Patented Aug. 12, 1969

3,461,437
DIGITAL MEMORY IN WHICH THE DRIVING OF EACH WORD LOCATION IS CONTROLLED BY A SWITCH CORE

James E. Webb, Administrator of the National Aeronautics and Space Administration, with respect to an invention of Lawrence J. Zottarelli, La Canada, Calif.

Filed Sept. 16, 1965, Ser. No. 487,940
Int. Cl. G11c 7/00
U.S. Cl. 340—174 10 Claims

ABSTRACT OF THE DISCLOSURE

A digital memory system including a plurality of word locations, each comprised of a plurality of memory elements having a drive line commonly coupled thereto. A different switch core is provided for each memory location with the drive line coupled to that location being connected in series with a first winding on the switch core. A different resistance path is connected in parallel across each serially connected drive line and first winding. Current is driven in a first direction through a drive line to switch the switch core coupled thereto to a set state without destroying information stored in memory elements coupled to that drive line. The set switch core is reset by driving current through a second winding thereon which induces a current in the drive line coupled thereto in a first direction, which does not destroy the information stored in the memory elements coupled thereto. Thus a switch core can be uniquely selected without destroying information stored in any of the memory elements.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates generally to digital memory systems.

Various digital memory systems are known in the prior art which employ magnetic memory elements, such as single or multiaperture magnetic cores. Each such memory system usually falls into one of two general types of systems distinguished primarily by the addressing schemes employed. More particularly, the two types of memory systems may respectively be referred to as coincident current systems and coincident magnetomotive force (MMF) systems.

In coincident current memories, half select currents are driven along a row and a column of a memory element matrix and information can be written into or read from the elements at the intersection of the selected row and column where the combined currents exceed a threshold value. Since all of the elements in the selected row or column, other than the element at the intersection, should not be affected by a single half select current, it is essential that the magnitude of the currents be maintained below critical values. On the other hand, it is of course essential that the select currents be greater than a certain minimum value if selection is to occur. Thus the requirement that the select currents be greater than a certain minimal value and less than a certain maximum value dictate that precise current generating circuitry be employed. Accordingly, where the memory system is to be used in an environment where the temperature is likely to vary over a relatively wide range, the temperature variations must be compensated for in order to prevent their having any effect on the precise control of the currents.

In order to avoid the necessity of compensating for temperature variations, word oriented memory systems can be used wherein the memory elements of a single memory location are coupled to a common drive line. Current can be provided to the selected drive line by any of several techniques. Since it is usually necessary that current flow in both directions through the drive line in order to permit both reading and writing, it has been necessary to either associate two separate drive lines with each word or provide a single drive line in series with oppositely poled diodes. Both the use of a second drive line and the use of a pair of diodes are reasonably costly and adversely affect the reliability of such memory systems.

Accordingly, it is an object of the present invention to provide a digital memory system which is less expensive than heretofore known systems.

It is an additional object of the present invention to provide a memory system of the aforedescribed type which does not need to be compensated for temperature variations and which avoids the use of a second drive line or the excessive use of diodes or their equivalent.

Briefly, in accordance with a preferred embodiment of the invention, a different switch core is provided for each memory location. A different drive line is coupled to all of the elements at each location and is connected in series with a first winding on a switch core associated with that location. A resistance path is connected in parallel with the drive line and first winding. Current can be driven in a first direction through drive lines without destroying the information stored in the memory element and such a current can switch the switch cores to a first remanent or set state. The switch cores can be driven to a second remanent or reset state by driving current through a second winding thereon which will induce a current in the drive line in the first direction, which it is noted will not destroy the information stored in the memory element. Thus, a switch core can be uniquely selected without destroying any stored information. Stored information can be destroyed in order to store new information by driving a third winding on the switch core to thus induce a current in a second direction through the drive line. Although the preferred embodiment of the invention illustrated herein is directed to a nondestructive readout memory system, it will be appreciated that the teachings of the invention are equally applicable to destructive readout systems.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block schematic diagram of a preferred embodiment of the present invention;

FIGURES 2(*a*)–(*d*) are diagrammatic representations of a particular multiaperture magnetic core, a transfluxor, and respectively show different magnetic states which can be defined therein;

Figure 1:
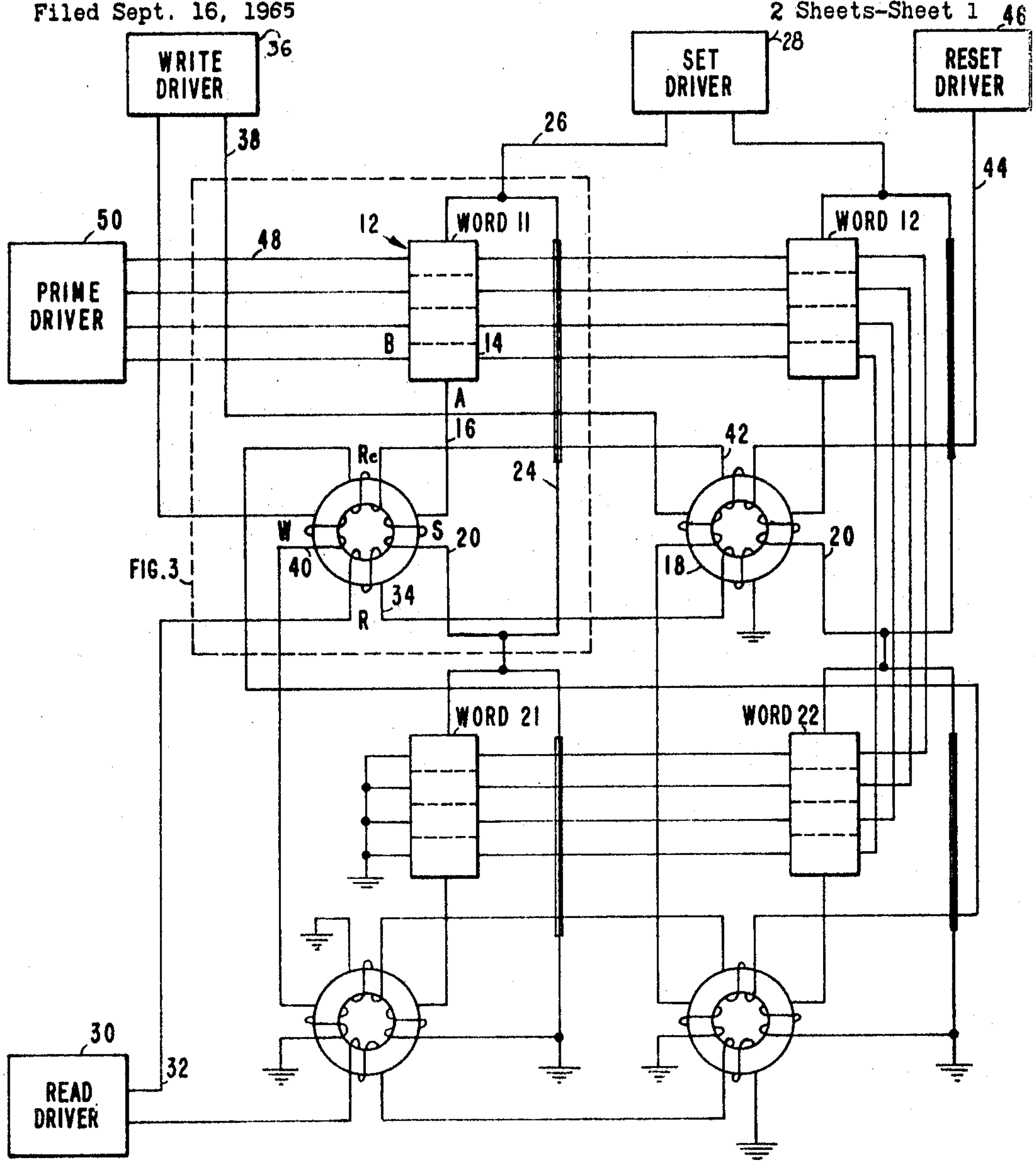

Attention is now called to the figures and initially to FIGURE 1 which illustrates a schematic block diagram of a digital memory system constructed in accordance with the teachings of the invention. Although the teachings of the invention are applicable to memories having any arbitrary word or bit capacity, it will be assumed herein that the memory has $mn$ words (where $m=n=2$), and each word contains $l$ (herein, four) bits. A word is represented in FIGURE 1 by block 12 which is shown to include four smaller blocks 14 each representative of a memory element.

In accordance with the teachings of the present invention, the words are arranged in a matrix comprised of $m$ rows and $n$ columns. Thus, particular words may be designated by their row and column position in the matrix and accordingly the word in row 1 and column 1 is identified on the drawing as word 1–1 and the word in row 2 of column 1 is identified as word 2–1. Associated with each of the words 12 is a drive line 16 which is used to cause information to be written into and read from the memory elements 14.

A switch core 18 is associated with each of the words in memory. A first or set winding 20 is wound on each switch core and is connected in series with the drive line 16 with which the switch core is associated. The drive line 16 and winding 20 form a series branch which is connected in parallel with a resistance wire 24. The parallel circuits comprised of the series branch and resistance wire 24 are connected in series along columns of the matrix. Thus, the parallel circuit associated with word 1–1 is connected in series with the parallel circuit associated with word 2–1. Current is selectively provided to each serially connected parallel circuit from each of $n$ output lines 26 extending from a set driver 28. More particularly, each output line 26 is connected to a junction between a drive line 16 and resistance wire 24 in row 1 of the matrix. The junctions in the last row of the matrix between windings 20 and resistance wires 24 are connected to a reference potential, e.g., ground. In response to address information applied to the set driver 28, current will be applied to a selected one of the output lines 26 and will flow to ground through the resistance wires 24 and the series branches comprised of the drive lines 16 and windings 20.

In addition to the set driver 28, a read driver 30 is provided which has a plurality of output lines 32 equal to the number of matrix rows. Each of the lines 32 is connected in series with a second or read winding 34 wound on each of the switch cores 18. The ends of the output lines 32 remote from the read driver 30 are connected to a reference source shown as ground.

A write driver 36 is also provided which has a number of output lines 38 equal to the number of matrix columns. Each of the lines 38 is connected in series with a third or write winding 40 wound on the switch cores 18. The far sides of the output lines 38 are also connected to a reference source such as ground. A fourth or reset winding 42 is also connected to each of the switch cores 18. The reset windings 42 are connected in series with an output line 44 of reset driver 46. The far side of output line 44 is also connected to a source of reference potential as ground.

In addition to the drive lines 16, each of which is associated with all of the memory elements 14 of a single word, a plurality of bit lines 48 are provided extending from a prime driver 50. Thus, where each word contains four bits, the prime driver will have four output lines, each coupled to a corresponding bit in all of the words in memory. The ends of each of the bit lines 48 remote from the prime driver 50 will also be assumed as being connected to a source of ground potential.

Figure 2:
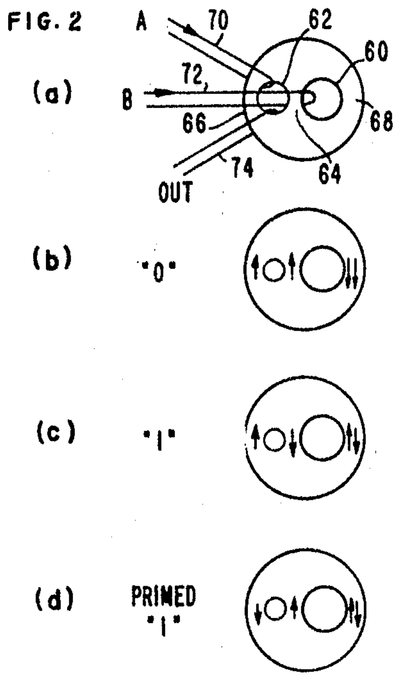
FIGURE 2(*e*) is a table describing currents which can be applied to the illustrated windings to cause the transfluxor to switch to different states.

Prior to considering the operation of the memory system illustrated in FIGURE 1, attention is called to FIGURE 2 illustrating a typical multiaperture magnetic element, the transfluxor, which can be very satisfactorily employed in the system of FIGURE 1. FIGURE 2($a$) illustrates a conventional transfluxor which comprises a core formed of magnetic material having square loop hysteresis characteristics. The transfluxor is characterized by having a large aperture 60 and a small aperture 62 therein which thus form a center flux leg 64, a small outer flux leg 66, and a large outer flux leg 68. As is well known in the art, the flux legs 64 and 66 should have approximately the same cross-sectional area and the flux leg 68 should have a cross-sectional area approximately equal to the sum of the cross-sectional areas of flux legs 64 and 66.

In accordance with the present invention, a first winding 70, which will hereafter be referred to as the A winding, is threaded through the small aperture 62 and thus coupled primarily to the flux leg 66. A second winding 72, hereinafter referred to as the B winding, is threaded through both apertures 60 and 62 around the center flux leg 64. A third winding 74, comprising a sense or output winding, is also threaded through one of the apertures, e.g., the small aperture 62 and is responsive to the flux switching around the small aperture 62 for providing an output signal.

FIGURE 2($b$) illustrates (by the arrows) a magnetic flux orientation within the transfluxor which will arbitrarily be assumed to represent a binary "0." Thus, it can be seen in FIGURE 2($b$) that the transfluxor is saturated in a clockwise direction with the flux orientation on both sides of the small aperture being in the same direction. FIGURE 2($c$) illustrates a flux orientation representative of a binary "1" and is characterized by the flux in legs 64 and 66 extending in opposite directions or substantially clockwise around the small aperture 62. It should be appreciated that when the transfluxor defines a binary "1," the net flux in leg 68 is substantially zero. A further state of interest herein is shown in FIGURE 2($d$) and will be referred to as the primed "1" or merely P1 state. It is characterized by the flux in leg 68 being substantially zero, as was the case with the "1" state, but in lieu of the flux being oriented in a clockwise direction about the aperture 62, it is oriented in a subsantially counterclockwise direction.

The table in FIGURE 2($e$) describes how the A and B windings can be employed to establish the states indicated in FIGURES 2($b$), ($c$), and ($d$). More paricularly, consider initially that the transfluxor is in a "0" state at time $t_1$ and that a positive current (in the direction of the arrow) is applied to the A winding while no current is applied to the B winding. Utilizing the familiar righthand rule, it should be clear that the current will merely tend to further saturate the flux in leg 66. Thus at time $t_2$ after the current in the A winding has been terminated, the transfluxor will still define a "0" state.

Now consider line 2 of the table in FIGURE 2($e$) which describes the response of the transfluxor to a positive current solely in the A winding when it defines a "1" state. Since again the current in the A winding will tend to further saturate the flux in leg 66, the transfluxor will not change state and it will define a "1" state at time $t_2$ if it had defined a "1" state at time $t_1$. Line 5 of Table 2 illustrates the response of the transfluxor to a positive current solely in the A winding when it is initially in the primed "1" state. The current will tend to switch the flux around the aperture 62 to drive the transfluxor to the "1" state. If the current through the A winding is very excessive, it could tend to drive the transfluxor from the primed "1" state to the "0" state. However, inasmuch as it requires a very much greater current to switch the transfluxor from the primed "1" to the "0" state than it does to switch it to the "1" state, it is relatively easy to maintain the current on the A winding within proper limits.

Now consider lines 3 and 4 of the table of FIGURE 2($e$) wherein it is assumed that a positive current is applied to the B winding for "0" and "1" states of the transfluxor. It should be appreciated that where a "0" is initially defined, the current in the B winding will merely tend to further saturate the center leg 64 thus having no effect on the magnetic orientation in the transfluxor. When the transfluxor is initially in a "1" state, the positive current on the B winding will switch the core to the primed "1" state. Again, although it is conceivably possible to switch the core from the "1" to the "0" state with an excessive current through the B winding, it is reasonably easy to maintain the B winding within proper limits. Line 5 of the table has already been discussed and line 6 is a duplicate of line 1. Lines 7 and 8 describe the transfluxor response to a negative current in the A winding with no current in the B winding. If a "0" state is initially defined, the current in the A winding will switch the transfluxor to the primed "1" state. Similarly, if a "1" state is defined, the negative current in the A winding will switch the flux in leg 66 to drive the transfluxor to the primed "1" state.

Line 9 of the table describes the response of the transfluxor to positive current supplied to both the A and B windings substantially simultaneously. If the transfluxor defines a "1" or primed "1" state, it will be driven to the "0" state inasmuch as the flux in both legs 64 and 66 will be driven upwardly. Line 10 of the table is a substantial duplication of line 2 and illustrates that if the transfluxor initially defines a "1" or a primed "1" state, a positive current on the A winding only will switch the transfluxor to the "1" state. Whenever the transfluxor switches of course, this fact is evident by a pulse being induced in the output winding 74.

Figure 3:
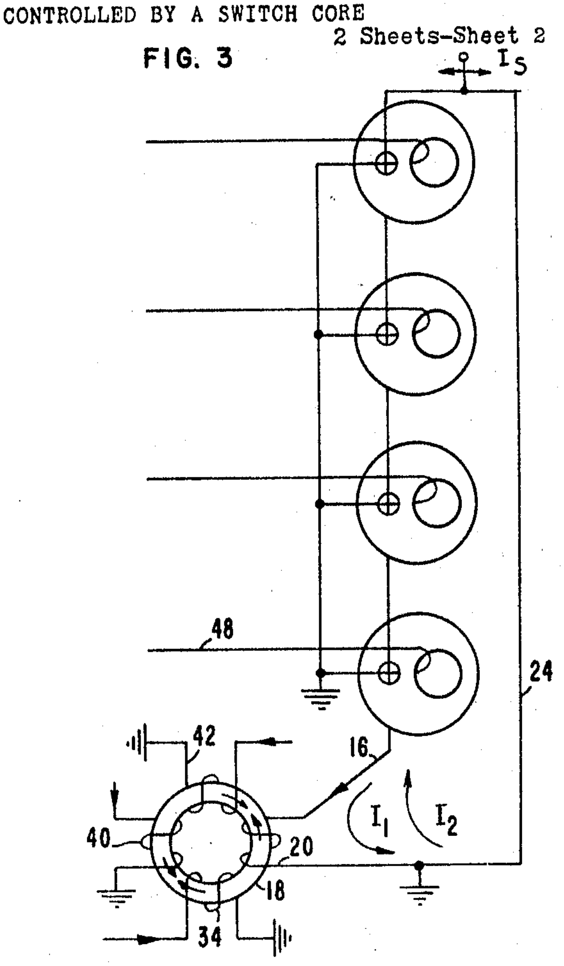
FIGURE 3 is a schematic diagram showing in detail how a word comprised of a plurality of transfluxors is coupled to a switch core uniquely associated therewith.
Figure 4:
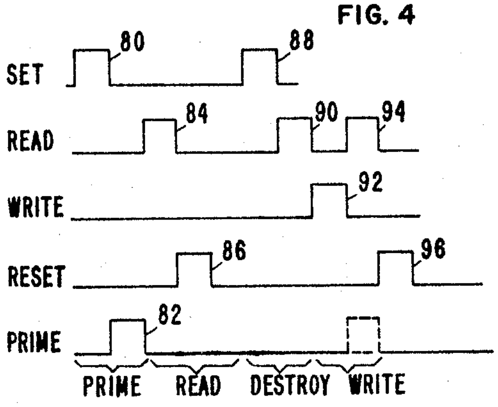
FIGURE 4 is a waveform chart provided for the purpose of explaining the operation of the preferred embodiment of the invention.

Attention is now called to FIGURES 3 and 4 which illustrate in greater detail the manner in which a switch core 18 of FIGURE 1 is coupled to the memory elements 14 of a word 12, it of course being assumed for purposes herein that the memory elements comprise transfluxors as shown in FIGURE 2. Each transfluxor B winding will be assumed to be connected to a different one of the bit lines 48 extending from the prime driver 50. The A winding, coupled to all of the transfluxors forming a single word, is connected to the drive line 16 previously discussed. The drive line 16 is of course connected in series with the set winding 20, which series branch is connected in parallel with a resistance wire 24. FIGURE 3 also illustrates the manner in which the read winding 34, the write winding 40, and the reset winding 42 are wound on the core 18.

FIGURE 4 illustrates the signals provided by the previously mentioned system drivers in order to read information from and write information into the memory elements 14. Reading will be initially considered and a nondestructive readout scheme will be disclosed. Let it be assumed that the switch cores 18 already define a reset state established by the reset winding 42. As shown by the arrows in FIGURE 3, the reset current causes the flux in the switch core 18 to be oriented in a clockwise direction. In order to select a particular one of the words in memory for reading, a set pulse 80 is provided by the set driver 28 to the selected output line 26. This current $I_s$ will divide between the series branch comprised of the drive line 16 and set winding 20 and the resistance wire 24. Thus, current will effectively flow in a positive direction through the A winding associated with the transfluxors, and as shown in lines 1 and 2 of the table of FIGURE 2(*e*), this current will not change the state of the transfluxors. As a consequence of the winding direction of the set winding 20 on the switch core 18, the set current will switch all of the cores 18 in the selected column to a set state in which the magnetic flux is oriented in a counterclockwise direction.

Subsequently, a current pulse 82 is applied to the bit lines 48 by the prime driver 50. This current pulse is effectively along the B winding and its effect is to switch those transfluxors in the "1" state to the primed "1" state.

A single switch core out of the column of set switch cores is then selected by the read driver 30 applying a current pulse 84 to one of the output lines 32. The current through winding 34 will switch one of the set cores to a reset state and by Lenz's law, will induce a current $I_1$ in the set winding 20 which again will flow through the drive line 16 in a first direction. As shown in lines 5 and 6 of the table of FIGURE 2(*e*), all of the transfluxors in a primed "1" state will switch to a "1" state thereby providing a signal on the sense winding 74 threaded through the small aperture 62 thereof. After the information has been read, a pulse 86 is applied to the reset windings 42 to again orient the flux in the switch cores 18 in a clockwise direction. It should thus be appreciated that reading has been accomplished without destroying any of the stored information.

In order to write information into the memory, a particular word is selected in a manner similar to that performed in the reading operation. More particularly, a set current pulse 88 is driven along one of the output lines 26 to set a column of switch cores. Read driver 30 then applies a read current pulse 90 to a selected one of the output lines 32 to thus reset the selected switch core 18 in the selected column. The write driver 36 then applies the current pulse 92 to a selected one of the output lines 38 to thereby switch the selected core 18 to a set state. Consequently, this will induce a current $I_2$ in the winding 20 which will flow in a second direction through the drive lines 16. As shown in lines 7 and 8 of the table of FIGURE 2(*e*) the current $I_2$ will destroy the information stored in the transfluxors and switch all of the transfluxors to a primed "1" state. With all of the transfluxors in the selected word now in a primed "1" state, information is written into the selected word by applying a pulse 94 on the read winding 34. If a pulse is simultaneously applied to the bit line 48, then the transfluxor will switch to a "0" state as shown in line 9 of the table of FIGURE 2(*e*). If, on the other hand, no current is applied to the bit line, then the transfluxor will switch to the "1" state. After information has been written into the memory, another reset current pulse 96 should be provided to reset the switch cores 18 in preparation for a subsequent operation.

From the foregoing, it should be appreciated that a word organized digital memory system has been disclosed herein which does not require the utilization of any semiconductors other than those required in the drivers. Moreover, the drive currents employed need not be precisely regulated and do not require compensation for temperature variations. These functional advantages of an embodiment of the invention are achieved primarily as a consequence of relating the switch cores 18 and the memory elements (the transfluxors) such that the switch cores can be switched from a reset to a set and then back to a reset state for selection purposes without destroying any of the stored information.

Although a specific embodiment of the invention has been illustrated herein, it should be readily appreciated by those skilled in the art that numerous modifications could be introduced without departing from the spirit or intended scope of the invention as set forth in the appended claims. For example, it is not essential that transfluxors of the type illustrated be employed and other multiaperture magnetic devices and similar memory elements could be substituted therefor. Also, it is not essential that the A and B windings be related to the prime driver 50 and switch core 18 as shown but in fact these could be reversed without requiring any substantial other modification of the system. Also, although a nondestructive readout scheme has been specifically disclosed herein, it should be appreciated by those skilled in the art that the disclosed apparatus could be operated in a destructive readout manner, if such operation is acceptable, in order to use fewer clock phases. A destructive read operation of course would require a write step after each read step.

What is claimed is:

1. In a digital memory system including a plurality of word locations, each comprised of a plurality of memory elements having a drive line commonly coupled thereto, selection and control means for controlling currents through said drive line comprising:

a switch core capable of defining first and second states;

a first winding on said switch core connected in series with said drive line to define a series branch;

first source means connecting to said series branch for driving current in a first direction therethrough to switch said switch core to said first state;

a conductive path connected in parallel with said series branch;

a second winding on said switch core; and second source means connected to said second winding for switching said switch core to said second state and for inducing a current in said drive line in said first direction.

2. The memory system of claim 1 including a third winding on said switch core; and third source means connected to said third winding for inducing a current in said series branch in a second direction.

3. A digital memory comprising:

at least one memory location comprised of a plurality of transfluxors, each having a center flux leg and a smaller and larger outer flux leg and being capable of defining first and second information storage states;

a drive line coupled to each of said smaller outer flux legs;

a switch core capable of defining first and second states;

a first winding on said switch core connected in series with said drive line to define a series branch;

first source means connected to said series branch for driving current in a first direction therethrough to switch said switch core to said first state without changing the storage states defined by said transfluxors;

a conductive path connected in parallel with said series branch;

a second winding on said switch core; and second source means connected to said second winding for switching said switch core to said second state and for inducing a current in said drive line in said first direction.

4. The memory system of claim 3 wherein said conductive path comprises a resistance wire.

5. The memory system of claim 3 including a third winding on said switch core; and third source means connected to said third winding for inducing a current in said series branch in a second direction to thereby destroy the storage states defined by said transfluxors.

6. A digital memory system comprising:

a plurality of memory elements arranged to define *mn* words each comprised of *l* elements;

*mn* switch cores arranged in a matrix including *m* columns and *n* rows;

*mn* drive lines each coupled to all of the elements of a different one of said *mn* words;

*mn* first windings, each of said first windings being coupled to a different one of said switch cores;

means connecting each of said first windings in series with a different one of said drive lines to thus form a series branch;

first source means connected to said series branches for driving current in a first direction therethrough for switching said switch cores to a first state;

a different resistance path connected in parallel across each of said series branches;

*mn* second windings, each of said second windings being coupled to a different one of said switch cores; and second source means connected to said second windings for switching said switch cores to a second state and for inducing currents in said drive lines in said first direction.

7. The memory system of claim 6 wherein each of said memory elements comprises a transfluxor having a center flux leg and a smaller and a larger outer flux leg and is capable of defining two information storage states;

said drive lines being coupled to said smaller outer flux legs.

8. The memory system of claim 7 including a third source means having *l* output lines, each of said *l* output lines being coupled to the sensor flux leg of a corresponding one of the *l* transfluxors in each of said words.

9. The memory system of claim 6 including a third winding on each of said switch cores; and third source means connected to said third windings for inducing currents in said series branches in a second direction.

10. A digital memory system comprising:

a plurality of memory elements arranged to define *mn* words each comprised of *l* elements;

*mn* switch cores arranged in a matrix including *m* columns and *n* rows;

*mn* drive lines each coupled to all of the elements of a different one of said *mn* words;

*mn* first windings, each of said first windings being coupled to a different one of said switch cores;

means connecting each of said first windings in series with a different one of said drive lines to thus form a series branch;

first source means connected to said series branches and actuatable to drive current in a first direction through a selected column of said series branches to switch the switch cores of that column to a first state;

a different resistance path connected in parallel across each of said series branches;

*mn* second windings each of said second windings being coupled to a different one of said switch cores; and second source means connected to said second windings and actuatable to drive current through a selected row of said second windings to cause the switch cores of that row to define a second state and to induce currents in a first direction in the drive lines associated with those switch cores and said selected row switching to said second state.

References Cited

UNITED STATES PATENTS

| | | | |
|---|---|---|---|
| 3,051,849 | 8/1962 | Zimbel | 340—174 XR |
| 3,089,035 | 5/1963 | Strohmeier et al. | 340—174 XR |
| 3,281,782 | 10/1966 | Frielinghaus | 340—174 XR |

BERNARD KONICK, Primary Examiner

G. M. HOFFMAN, Assistant Examiner